Dec. 8, 1925.  
W. E. WILLIAMS  
HUB DEMOUNTABLE DISK WHEEL  
Filed June 4, 1920
1,564,737
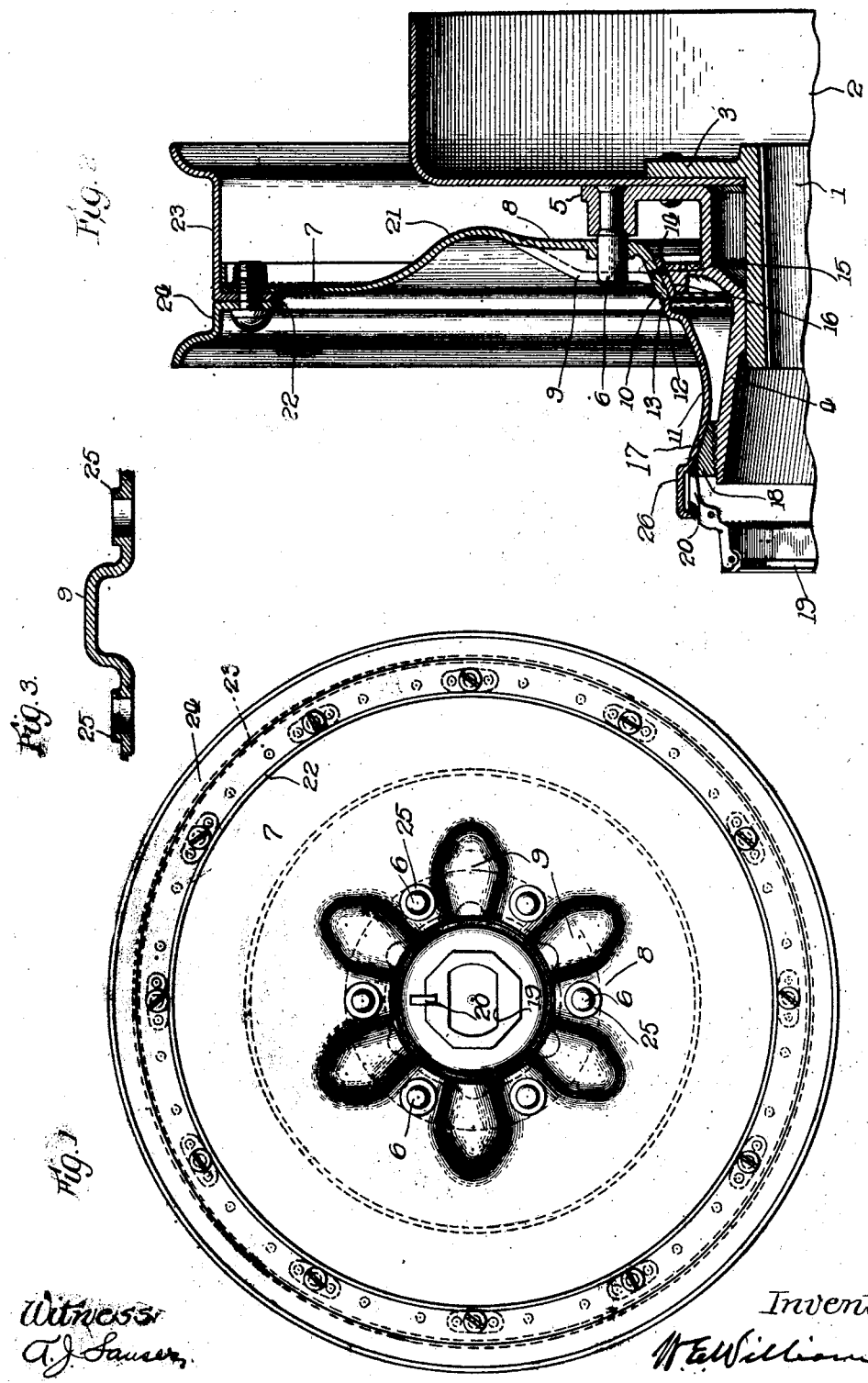

Patented Dec. 8, 1925.

1,564,737

UNITED STATES PATENT OFFICE.

WILLIAM ERASTUS WILLIAMS, OF CHICAGO, ILLINOIS, ASSIGNOR TO AMERICAN STEEL FOUNDRIES, OF CHICAGO, ILLINOIS, A CORPORATION OF NEW JERSEY.

HUB DEMOUNTABLE DISK WHEEL.

Application filed June 4, 1920. Serial No. 386,446.

*To all whom it may concern:*

Be it known that I, WILLIAM ERASTUS WILLIAMS, a citizen of the United States, and a resident of Chicago, in the county of Cook and State of Illinois, have invented a new and useful Improvement in Hub Demountable Disk Wheels, of which the following is a specification.

My invention relates to wheels that have the webs thereof made of disks and are demounted from the hub through the medium of a single hub fastening in a manner common with wire wheels used in the automobile service.

The object of my invention is to produce a very rigid demountable disk wheel and one that may be constructed with little expense.

Reference will be had to the accompanying drawings in which Figure 1 is a front elevation of the wheel.

Figure 2 is a transverse sectional detail on a larger scale than that of Figure 1.

Figure 3 is a detail of a hub feature.

In the drawing 1 indicates the ordinary fixed hub of the rear wheel of an automobile and 2 indicates the brake drum secured thereto through the medium of the flange 3 of the hub. On the outside of hub 1 there is an adapter hub 4 peculiarly constructed for receiving a demountable wire wheel and also my type of a demountable wheel.

It is a common practice, however, to make the ordinary hub 1 and the adapter hub 4 as an integral unitary piece instead of making it in two pieces as I have shown it. On the adapter hub 4 there is the flange 5 which supports a series of registering pins 6 for resisting the rotation of the demountable wheel upon the hub.

I prefer to make my wheel out of a tapered disk having the thinner portion 7 extending to the rim and the thicker portion 8, nearer the hub. I also stiffen this hub zone of the disk by a series of corrugations 9. The inner zone of the disk terminates in a flange 10 which embraces a hub extension or shell 11 provided with an annual bulge or rib 12 against which the flange 10 registers.

When desired I weld the joint between this flange 10 and rib 12 around the region 13, thus making the hub barrel 11 and disk 1 as it were a unitary member. I may if I choose weld through this flange and the inner end 14 of the barrel 11 as indicated by spot welds 15, giving added strength to the junction of these two pieces. The inner end or flange 14 of the barrel 11 fits over the inclined portion 16 of the hub member 4, and thus brings the parts into accurate registry.

The barrel 11 is expanded at its outer end as is indicated by 17, and furnishes a bearing seat for the inclined portion 18 of a nut 19 of the ordinary pattern of a fastening nut for demountable wheels of the wire wheel type. A latch 20 is used as a nut lock to prevent the nut 19 from being released accidentally from engagement on the end of the hub in an ordinary manner. The web or disk of my wheel is curved as shown by 21, giving a slight degree of elasticity to the wheel and is secured to the rim through the medium of an inwardly extending flange 22 of the rim 23 here shown, as made with a companion flange 24. Other types may be used with this disk and fastening means other than that shown, may be employed between the disk and the rim.

Wire wheel bodies are demounted as a whole by releasing one nut, and equally simple provision for demounting a disk wheel is highly desirable, but it has been found difficult to secure this result without too great cost. The difficulty is avoided by making the disk and hub sleeve 11 separately and connecting them to form a unitary structure or disk and hub. This construction is inexpensive and only light metal is needed because the drawing is comparatively slight.

The inclined bearing portion of flange 16 of the hub supports the flange 14 of the hub barrel and the superposed flange 10 of the disk and thus carries the rolling load of the wheel in a manner to avoid straining the union of the two members at that point which is a great desideratum.

In uniting the disk web with the hub sleeve or barrel 11 the flange 14 of the latter is made cylindrical or rather, small enough in diameter to be entered into the aperture of the flange 10 of the disk and after the same is entered therein the flange 14 is expanded outward into the form shown in the drawings.

In place of the above method of assembling the sleeve or barrel 11 and body of the disk, I may form the said barrel 11 without a complete rib 12, enter it in place from the rear side and then press the rib to the form shown.

I may if desired make the flange 10 of the disk large enough to pass over this rib, swell or bulge 12 of the member 11 and then swage the flange 10 down or contract it into the engagement shown. The methods above described of fastening insures a mechanical union of the separate parts which is a strong connection independently of the welding operation but the welding insures a stronger connection.

The front end of my tube or barrel 11 is expanded as indicated by 26 to permit space for the latch device 20.

The apertures in the disk 7 through which the pins 6 pass are reinforced as indicated by 25.

What I claim is:—

1. The combination with a hub elongated outwardly with respect to the wheel's plane, having projections on which a wheel disk may slide transversely to its own plane but bars relative rotation of disk and hub, and further having a central, peripheral, tapered support for a hub sleeve, of an outwardly tapered hub sleeve fitting over and longitudinally adjustable with respect to said support, a disk having around its central opening a lateral flange overlapping and permanently united with the inner portion of said sleeve, and means for securing the outer end of the sleeve to the hub and forcing it longitudinally into rigid engagement with the tapered support.

2. The combination with a hub having in the region of the wheel's central plane an outwardly tapered hub sleeve seat, of a hub sleeve having its inner end portion fitting over and adjustable along said seat and provided with an external projection, a wheel disk having a central aperture surrounded by a flange fitting over said inner end portion and abutting said projection, and a hub-engaging nut arranged to force the sleeve inward upon the hub into rigid engagement with said seat.

3. The combination with a wheel hub having a peripherally coned flange, of a disk having an outwardly extending flange about its central opening adapted to seat upon the hub flange, a primarily independent hub sleeve overlapping the disk flange, the overlapping parts being permanently engaged with each other, and securing means to mount the disk and sleeve laterally upon the hub flange.

4. The combination with a wheel hub extending outwardly far beyond the wheel rim's plane and having in that plane an annular, outwardly tapered hub sleeve seat, of an elongated, outwardly tapered, disk bracing hub sleeve having its inner end portion fitting said seat and its outer end portion secured to the outer end portion of the hub, and a wheel disk having a lateral flange fitting over and rigidly united with the inner end of the sleeve, whereby the disk and sleeve form a practically unitary structure readily removable from the hub.

5. The combination with a hub having in the region of the wheel's load plane a peripheral, outwardly tapered hub sleeve seat, of a wheel disk having a central outwardly converging lateral flange in the plane of said seat, an outwardly tapered hub sleeve resting internally on said seat and having its inner end portion overlapping and closely fitting between said seat and flange and permanently united with the latter, means for locking the disk against rotation on the hub while allowing it to move along the same, and means for detachably connecting the outer ends of the hub and sleeve and pressing the latter inwardly.

6. The combination with a wheel disk having around its central opening an annular flange, of an outwardly tapered, elongated hub sleeve overlapping and permanently united with said flange, a hub having a peripheral flange alongside the disk and a peripheral projection supporting the overlapping portions of the disk flange and sleeve, means barring rotation of the disk upon the hub while allowing it to move freely along the same, and means for separably connecting the outer end portions of the sleeve and hub.

Signed at Chicago, in the county of Cook and State of Illinois, this 1st day of June, 1920.

WILLIAM ERASTUS WILLIAMS.